United States Patent
Solis et al.

(10) Patent No.: US 7,877,503 B2
(45) Date of Patent: Jan. 25, 2011

(54) METHOD AND SYSTEM FOR AN INTERCEPT CHAIN OF CUSTODY PROTOCOL

(75) Inventors: Norman Richard Solis, Fairfax, VA (US); Dante J. Pacella, Charles Town, WV (US); Harold Jason Schiller, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 264 days.

(21) Appl. No.: 12/166,679

(22) Filed: Jul. 2, 2008

(65) Prior Publication Data
US 2010/0005188 A1      Jan. 7, 2010

(51) Int. Cl.
*G01R 31/08* (2006.01)

(52) U.S. Cl. .................. 709/232; 709/223; 709/224; 709/225; 709/230; 709/246; 709/247; 370/235; 370/229; 370/230; 370/241; 370/252; 370/351; 726/1; 726/3; 726/5

(58) Field of Classification Search ......... 709/223–225, 709/232, 246–247; 455/39, 67.11, 91, 115.1, 455/130, 226.1; 726/1–3, 5, 11, 13, 21–23, 726/25–27; 370/229–230, 235–236, 236.2, 370/241, 252, 351, 392, 394
See application file for complete search history.

(56) References Cited

U.S. PATENT DOCUMENTS

| | | | |
|---|---|---|---|
| 6,826,686 B1* | 11/2004 | Peyravian et al. ........... | 713/168 |
| 7,568,223 B2* | 7/2009 | Sprunk et al. ............... | 726/10 |
| 7,668,954 B1* | 2/2010 | Melvin ....................... | 709/224 |
| 7,735,120 B2* | 6/2010 | Wallace et al. .............. | 726/5 |
| 2006/0218273 A1* | 9/2006 | Melvin ....................... | 709/224 |
| 2008/0104390 A1* | 5/2008 | VanHeyningen et al. ..... | 713/151 |
| 2008/0276294 A1* | 11/2008 | Brady ......................... | 726/1 |
| 2008/0294786 A1* | 11/2008 | Tinker et al. ................ | 709/229 |
| 2009/0007234 A1* | 1/2009 | Birger et al. ................. | 726/3 |
| 2009/0025063 A1* | 1/2009 | Thomas ....................... | 726/4 |
| 2009/0041252 A1* | 2/2009 | Hanna ......................... | 380/278 |
| 2009/0129314 A1* | 5/2009 | Weniger et al. ............. | 370/328 |
| 2009/0130984 A1* | 5/2009 | Lee ............................ | 455/67.11 |
| 2009/0132813 A1* | 5/2009 | Schibuk ....................... | 713/158 |
| 2009/0253411 A1* | 10/2009 | Arkko et al. ................ | 455/411 |
| 2009/0323954 A1* | 12/2009 | Sprunk et al. ............... | 380/259 |

* cited by examiner

*Primary Examiner*—Alina N. Boutah

(57) ABSTRACT

Techniques for establishing a chain of custody for intercepted electronic information are disclosed. In one particular exemplary embodiment, the techniques may be realized as a method, comprising securely negotiating a data collection interval time and protocol support for electronic data collection between network equipment associated with a data collecting party and network equipment associated with a data receiving party, receiving a nonce at a network equipment associated with the data collecting party from network equipment associated with the data receiving party, utilizing the nonce to compute, at least in part, a hash value at network equipment associated with the data collecting party, collecting electronic data at an intercept access device at network equipment associated with the data collecting party, utilizing the nonce and the hash value to transmit the collected electronic data to network equipment associated with the data receiving party, and utilizing the hash value to establish a chain of custody between the data collecting party and the data receiving party.

21 Claims, 4 Drawing Sheets

METHOD AND SYSTEM FOR AN INTERCEPT CHAIN OF CUSTODY PROTOCOL

BACKGROUND INFORMATION

The Communications Assistance for Law Enforcement Act (CALEA) is a wiretapping law that was passed in 1994, which recites that telecommunications carriers "shall ensure that its equipment, facilities, or services that provide customer or subscriber with the ability to originate, terminate, or direct communications are capable of expeditiously isolating and enabling government . . . intercept, to the exclusion of any other communications, all wire and electronic communications carried by the carrier." In other words, the CALEA provides that telecommunication carriers, such as common telephone carriers, facilities-based broadband Internet access providers, providers of interconnected Voice over Internet Protocol (VoIP) service, and manufacturers of telecommunications equipment, must design their equipment and networks to facilitate lawfully conducted intercepts, while protecting the privacy rights of customers.

However, these systems and/or techniques may not be able to establish that intercepted information was obtained from a requested system, that intercepted information was obtained from all requested systems, or even to establish which systems intercepted information was obtained from. Furthermore, current systems and/or techniques may not be capable of establishing the origination system or piece of equipment of intercepted information, and also across which equipment intercepted information traveled. As a result, current systems and methods lack the ability to establish a chain of custody for intercepted information.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

Figure 1:
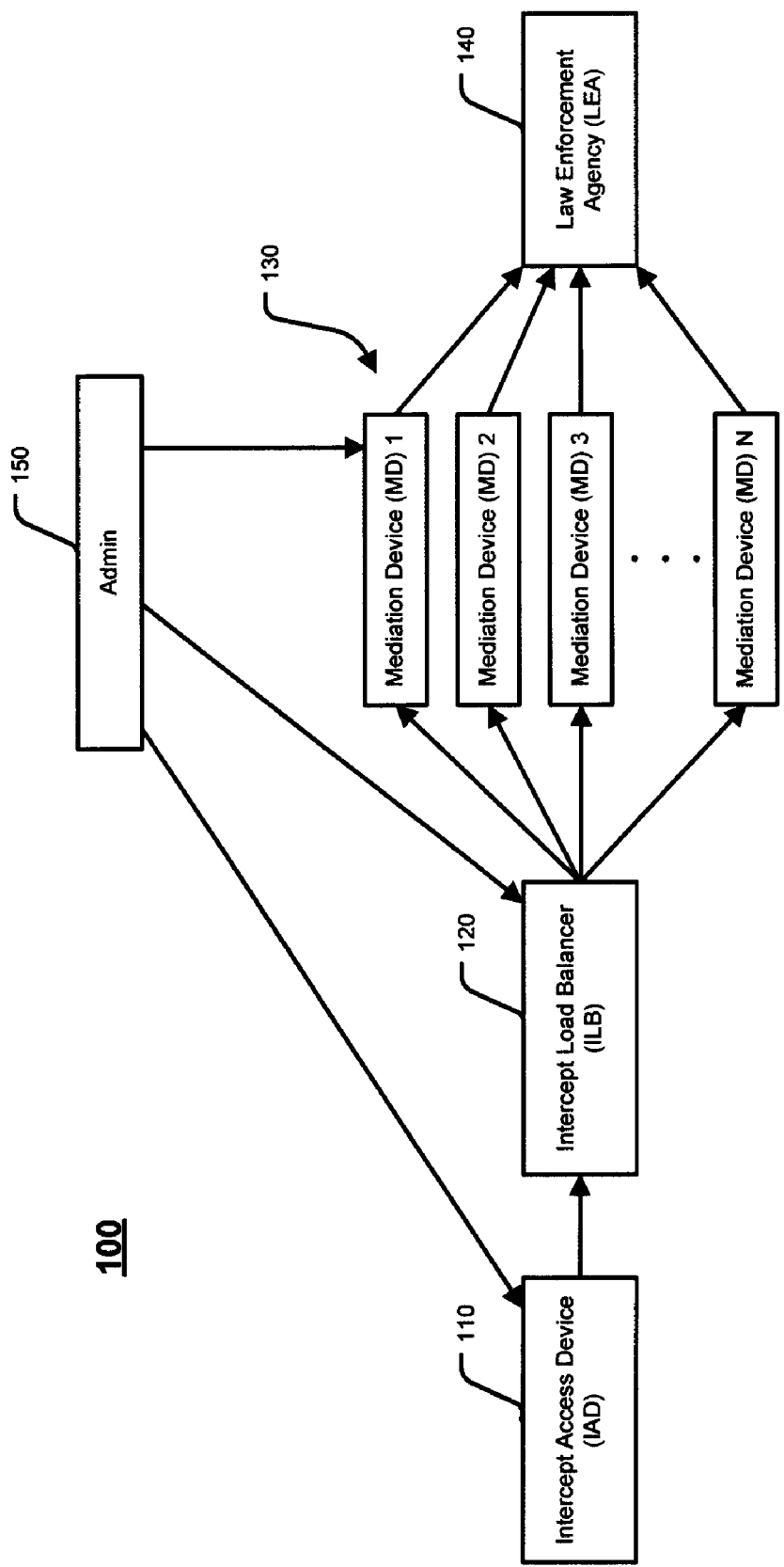
FIG. 1 depicts a block diagram of a system architecture for establishing and maintaining a chain of custody for intercepted information, according to an exemplary embodiment.

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for establishing a chain of custody for information intercepted pursuant to a legally obtained warrant. That is, exemplary embodiments may, among other things, be capable of establishing a point of origin, such as a source IP address or a source port on an access device, for intercepted information. Exemplary embodiments may also be capable of establishing one or more systems or pieces of equipment across which intercepted information traversed in transit to a data receiving party, the timestamp or other temporal information related to the interception and/or transmission of the intercepted information, and/or one or more systems which had access to intercepted information.

The exemplary systems and methods are discussed in terms of "intercept flows." It should be appreciated that as used herein, an "intercept" may refer to traffic coming from a tap for specific IP traffic. A "flow," as used herein, may refer to flow of information, such as those communicated over a network. For example, a flow may include an Internet Protocol (IP) flow of information having a unique "5-tuple." It should be appreciated that a "5-tuple," as used herein, may include various information, such as source IP address, destination IP address, protocol, source port, destination port, and/or other identifier. An "intercept ID," as used herein, may refer to a unique value associated with an intercept. An "intercept sequence number," as used herein, may refer to a sequence number (e.g., a 32-bit sequence number) that enumerates information packets in order for an intercept irrespective of the individual IP flows making up the intercept.

The "chain of custody" as used herein may refer to evidence sufficient to establish the seizure, custody, control, disposition, authenticity and/or other aspects of intercepted information.

A nonce (Number used Once) as used herein may refer to an arbitrary number that may be generated for security purposes. A nonce may be effectively random and may deter spoofing or forging of packets or other electronic data.

An initialization vector as used herein may refer to a continuously changing number incorporated into a set of values that are used as inputs to a hash function, such that two identical packets do not produce the same hash value. This may reduce the ability to determine the input to a hash function via the repetition of a sequence of hash values. For example, if the address fields in a packet are identical, the hash value of encrypted address fields may be identical if not for the use of a varying initialization vector incorporated as one of the hash function inputs.

The Inter-Control Center Communications Protocol (ICCP) as used herein, may refer to a real time data exchange protocol enabling data transfer, monitoring and control. A person of ordinary skill in the art would appreciate that other protocols may be utilized to facilitate secure data exchange.

It should also be appreciated that as used herein, a "hash value" may refer to a unique value used for identification purposes of a relatively large amount of information (e.g., in a data packet or document). For example, a hash value may be a string of digits that uniquely identify a document. One property of a hash value is that even if the hash value is known, the original data used to compute that value may not be readily used to recreate the document. However, for any given document, the same hash value may be easily recreated via computation. In addition, a "hash collision," as used herein, may refer to a situation where two or more different documents generate the same hash value. Thus, when a hash collision occurs between two or more hash inputs to a hash function, it may be presumed via statistical measures of security that the original documents corresponding to the two or more hash values are the same document. Accordingly, the generation, addition, and/or use of hash values may permit identification of the flows (e.g., documents or other information) by looking at individual hashes, rather than at a large 5-tuple, as a way to efficiently and effectively provide authentication of one or more packets or other components of a flow.

Hash functions and the corresponding hash values they generate may be used not only to uniquely identify a packet, but also to provide authentication and verification of a packet, document or other information associated with a hash value. Hash functions may be cryptographic hash functions, such as the Secure Hash Algorithms (SHA) designed by the National Security Agency (NSA). Hash functions may utilize inputs other than the 5-tuple to generate a hash value. For example, hash functions may utilize a nonce, an initialization vector or other inputs.

FIG. 1 depicts a block diagram of a system architecture for establishing and maintaining a chain of custody for intercepted information, according to an exemplary embodiment. It should be appreciated that system 100 is a simplified view for establishing and maintaining a chain of custody for intercepted information of one or more flows and may include additional elements that are not depicted. As illustrated, the system 100 may be part of a network and may include an intercept access device (IAD) 110 operatively coupled to an intercept load balancer (ILB) 120. The intercept load balancer 120 may be operatively coupled to one or more mediation devices (MDs) 130, which in turn may be operatively coupled to and ultimately pass intercepted information, e.g., an intercepted data packet, to a law enforcement agency (LEA) 140 pursuant to a legally obtained warrant. An administrator 150 may be also be provided at the system 100 to communicate to with the one or more mediation devices 130, the intercept load balancer 120, the intercept access device 110, and/or other components of the system 100. It should be appreciated that while the intercept access device 110, the intercept load balancer 120, and the mediation devices 130 may be one or more servers, server-like devices, and/or modules, other various network devices or components may also be used.

In the system 100, one or more flows may be intercepted at the intercept access device 110. The intercept access device 110 may receive intercept instructions from one or more mediation devices 130. The intercept access device 110 may be connected to one or more network elements of a data collecting party's network, such as a service provider network. Typically, a law enforcement agency 140 may request from a service provider information relating to a particular individual (e.g., all websites visited by a particular subscriber of the service provider), a particular host (e.g., all visits to a particular website and by all visitors), or a combination thereof (e.g., all visits to one or more particular websites by a particular individual). A law enforcement agency 140 may refer to any entity with the power to request assistance under the CALEA portions of the Communications Act. Such agencies may include local law enforcement at the city, state, and federal level. In practice, this may include almost any government body with the power to compel assistance via the issuance of a warrant. In other embodiments, other data receiving and/or data requesting parties may be substituted for law enforcement agency 140. Transmission of data to a data receiving and/or data requesting party shall be pursuant to a legally obtained warrant. The administrator 150 may instruct the one or more mediation devices 130 to acquire copies of such information at the intercept access device 110. Thus, when the intercept access device 110 recognizes information communicated to or from a particular subscriber or a particular host, for example, the intercept access device 110 may intercept the flow by copying the flow and sending the information to the intercept load balancer 120 for distributing to the one or more mediation devices 130, which in turn may send the information to the law enforcement agency 140. It should be appreciated that intercepting information may not substantially affect transmission and/or reception of information to/from the subject of a warrant (e.g., a particular subscriber, particular website, etc.).

In other words, if Mr. X is the subject of a warrant, for example, a law enforcement agency 140 may request Mr. X's service provider to provide all information relating to Mr. X's visits to a particular website over a predetermined period of time. Such information may include copies of one or more of Mr. X's requests and transmissions to and from this particular website. The one or more mediation devices 130 may be programmed to retrieve such information by an Administrator 150. As a result, each time Mr. X visits this particular website during the predetermined period of time, the intercept access device 110 may intercept the flow by copying one or more packets of information and preparing them for delivery to the intercept load balancer 120. It should be appreciated that other information consisting of metadata about the intercept may also be delivered with the packets. Examples of metadata may include timestamp information as well as other identifying data about the endpoints of the communication or the intercept itself.

In one or more embodiments, a data requesting party, such as a law enforcement agency 140, and a data collecting party, such as a service provider, may establish secure communications prior to beginning a data intercept. For example, the law enforcement agency 140 and a data collecting party may negotiate protocol support for an intercept, such as, for example, determining a version of ICCP (Inter-Control Center Communications Protocol) to utilize for the intercept. The law enforcement agency 140 and the data collecting party may also determine an evidence bag interval. The evidence bag interval may represent a time interval during which a unique identifier, such as a nonce, may be utilized in data transmissions. A nonce may be generated and provided by a data requesting party, such as law enforcement agency 140. At the end of an evidence bag interval, a subsequent nonce may be generated and provided by law enforcement agency 140 to a data collector for use in data intercepts. The nonce, due to its uniqueness and effective randomness, may certify to law enforcement agency 140 that electronic data containing that information could not have been produced prior to the generation of the nonce itself. The nonce may also be used by a data collecting party as an input to a hash algorithm. The nonce may also be included in a header or other information associated with the intercepted data. Thus the nonce because of its uniqueness and known lifetime may verify the integrity of intercepted data and the timeframe in which the data was collected.

It should be appreciated that flows or data packets may be intercepted in real-time or near real-time, e.g., at about the same time as the original or actual intercept. It should also be appreciated that intercepted information may be stored in one or more data storage systems (not shown) in the system 100. For example, these one or more data storage systems may be connected to the intercept access device 110, the intercept load balancer 120, the mediation devices 130, the law enforcement agency 140, or a combination thereof.

In addition, it should be appreciated that each intercepted data packet may be encapsulated at the intercept access device 110, the intercept load balancer 120, and/or at the mediation devices 130. In one or more embodiments, an intercepted packet may be encapsulated at multiple hops of a transmission from an intercepting party to a receiving party. For example, a packet may be encapsulated at the intercept access device 110, transmitted to the intercept load balancer 120, encapsulated at the intercept load balancer 120, transmitted to one of the mediation devices 130, encapsulated at one of the mediation devices 130, and transmitted to the law enforcement agency 140.

Before proceeding to the law enforcement agency 140, the intercept load balancer 120 may receive the intercepted data packet from the intercept access device 110 and may add a hash of the 5-tuple of the intercepted data packet to the re-encapsulated data packet. A hash may be generated by mathematical computation or other computations. As discussed above, a 5-tuple of an intercepted data packet may include various identification information of the packet, such as a source IP address, destination IP address, protocol, source port, destination port, and/or other identifier. Although the 5-tuple provides a unique identification of the intercepted data packet, since it may include a large number of different identifiers makes it relatively difficult to use. For example, using the 5-tuple may be relatively time-consuming and inefficient and may require additional software and/or hardware resources, thereby increasing costs as well. As a result, adding a hash function to the intercepted data packet may provide a more efficient manner to identify the intercepted data packets. For example, rather than unpacking and interpreting an entire 5-tuple, a hash function may serve as a tracking/identifying means for each intercepted data packet. The intercept load balancer 120 may then forward an intercepted data packet to on the mediation device 130s.

A mediation device 130 may typically take one or more packets from the intercept load balancer 120, add some more information to the packets, and reformat the packets in a common format for distribution to the law enforcement agency (LEA) 140. Each one of the mediation devices 130 may then independently deliver the packets to the law enforcement agency 140 where the law enforcement agency 140 may record and/or arrange the packets as desired. It should be appreciated that each of the mediation devices 130 may reformat the data packets for delivery to the law enforcement agency 140. This may include reformatting, adding additional information, such as time stamp information, etc.

There may be several ways an intercept load balancer 120 may use hash functions. For example, once data packets are intercepted, as described above, the packets may be encapsulated and/or identified. Once the data packets reach the intercept load balancer 120, the intercept load balancer 120 may add a hash value to each packet and recognize that they correspond to distinct flows. In one embodiment, the intercept load balancer 120 may determine that hash values within a first range may go to a first mediation device, hash values within a second range may go to a second mediation device, and so forth. Thus, in the example, the one or more mediation devices may be pre-set to receive packets having certain hash values.

Hash functions may be utilized not only to ensure the distinction between one or more flows, but also the integrity of one or more packets, and the verification of one or more equipment IDs associated with one or more packets. As mentioned above, a hash function may utilize a nonce to ensure that intercepted data was intercepted within a certain timeframe. Intercepted data, such as a packet, may utilize multiple hash values. A first hash value may utilize a 5-tuple hash as explained above, to ensure that a packet is distributed correctly.

A second hash value may also be included in a packet header to ensure the packet integrity. The second hash value may utilize a secure hash function, such as a SHA, on the entire packet and a nonce associated with the packet. The law enforcement agency 140 or the data collector, as the only parties who know the nonce, may utilize the nonce and this resulting hash value to verify the packet integrity.

A third hash value may be provided in one or more embodiments to provide a chain of custody for intercepted data. The third hash value may utilize multiple inputs to ensure the chain of custody. For example, the chain of custody hash value may be computed utilizing the nonce, a data collecting party secret, an initialization vector and a network element ID. The chain of custody hash value may be utilized by the data collecting party to encode collected data, such as one or more packets. A data collecting party secret may be a secret code or key known only to the data collecting party. A service provider, or other data collecting party, may encode one or more packets utilizing the chain of custody hash value, a SHA hash value of the whole packet, and the nonce. A data receiving party, such as a law enforcement agency 140, may utilize the nonce to determine that the packet is valid. The law enforcement agency 140 may utilize the chain of custody hash value to verify the packet integrity. The network element ID may be a unique identifier corresponding to a piece of network equipment at which a packet was encapsulated.

In one or more embodiments, a chain of custody hash value may be utilized to encapsulate a packet at multiple hops of a transmission of a packet from an intercept access device to a data receiving party. At each of the one or more hops, a packet may be encoded with the network equipment ID corresponding to the equipment encoding the packet at that hop. For example, a packet may be encapsulated with a first chain of custody hash value and encoded with a first network equipment ID at intercept access device 110. The packet may be transmitted by intercept access device 110 and received by intercept load balancer 120. Intercept load balancer 120 may encode the packet with a second network equipment ID corresponding to intercept load balancer 120 and may encapsulate the packet with a second chain of custody hash value. The packet may be transmitted to one of the mediation device 130's. The mediation device 130 may encode the packet with the mediation device 130's own unique network equipment ID and encapsulate the packet with a third chain of custody hash value. The law enforcement agency 140 may then receive the packet. The law enforcement agency 140 may first confirm a previously issued nonce with a nonce in an arriving flow to verify that the arriving flow is valid. The law enforcement agency 140 may then utilize the chain of custody hash values and the network equipment IDs to verify each hop that a packet traversed from interception to receipt at the law enforcement agency equipment. The law enforcement agency 140 may cross reference network equipment IDs with a data collecting party to identify equipment. In one or more embodiments, a data collecting party and a data receiving party may utilize Inter-Control Center Communications Protocol (ICCP) to facilitate the data transmission.

An administrator 150 may also be provided in the system 100. The administrator 150 may receive requests from the law enforcement agency 140 and may communicate these requests to a network, e.g., system 100. For example, one or more set tap functions may be initiated by the administrator 150 so that each of the individual elements of the system 100, such as the intercept access device 110, the intercept load balancer 120, and the one or more mediation devices 130, will be able to identify the data to be intercepted. In another embodiment, the administrator 150 may simply communicate with the one or more mediation devices 130, which would then communicate with the other system components.

It should be appreciated that the intercept load balancer 120 may be an independent component of the system 100 (e.g., a stand-alone L4 switching chassis), as depicted in FIG.

1. However, it should be appreciated that the intercept load balancer 120 may also be integrated with the intercept access device 110. Other various embodiments may also be provided.

It should be appreciated that the system 100 may be implemented by any telecommunication carrier. These may include common telephone carriers, facilities-based broadband Internet access providers, providers of interconnected Voice over Internet Protocol (VoIP) service, and/or other similar service providers that facilitate communication and/or information transmission.

It should be appreciated that while FIG. 1 depicts one intercept access device, one intercept load balancer, and four (4) mediation devices, a greater or lesser number of these system components may also be provided. Furthermore, it should be appreciated that the system of FIG. 1 may be a small network or a large network. It should also be appreciated that although depicted as a singular system, multiple systems may be communicatively coupled to perform the features and functionalities discussed above. Other various embodiments may also be provided.

Figure 2:
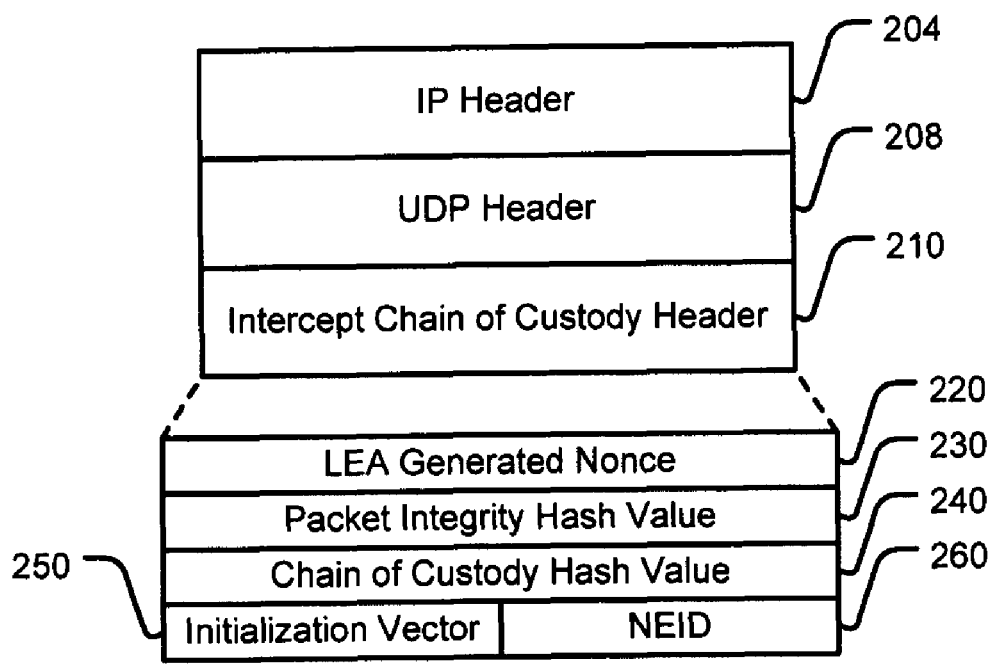
FIG. 2 depicts a header format for a packet, according to an exemplary embodiment.

FIG. 2 depicts an exemplary header format for a packet, according to an exemplary embodiment. This packet may include an IP Header 204 and/or a UDP Header 208 which may allow for intercepted data to be encapsulated in a manner that permits encapsulation and the inclusion of hash values and other values to establish packet integrity and a chain of custody. In this example, an intercepted packet may include an intercept chain of custody header 210. Once an intercept access device 110 intercepts a data packet, an intercept chain of custody header 210 may be added, as described above, to the packet header. The intercept chain of custody header 210 may include a law enforcement agency generated nonce 220, packet integrity hash value 230, chain of custody hash value 240, initialization vector 250, network equipment ID 260, and/or other data.

Law enforcement agency generated nonce 220 may represent a specific evidence bag negotiated between a data collecting party and a data receiving party. Since both parties may negotiate and agree upon the interval between receiving nonces, the lifetime for a nonce may be determinable. Since a nonce is effectively random and is not known in advance, a packet containing a nonce may be determined to have been created after the generation of the nonce by the law enforcement agency 140. A nonce may have a lifetime corresponding to a negotiated interval time for the nonce. Packets received containing that nonce outside of that lifetime may be considered invalid by the law enforcement agency.

An initialization vector 250 may be a continuously changing number used as part of an encryption method to ensure that identical text encrypted separately, such as two identical packets, does not produce the same hash value. This may reduce the ability of a person to decode a hash value due to the repetition of the hash value. For example, if the nonce, the network equipment ID and other values from a packet utilized in generating a hash value are identical, the hash value may be identical across multiple packets if not for the use of a varying initialization vector 250. Each device that participates in the chain of custody may insert a unique initialization vector into the chain of custody header.

Network equipment ID 260 may be a number, a stream of bytes, a network name or other identifier that uniquely identifies a piece of network equipment belonging to a data collecting party. Network equipment ID 260 may be utilized to identify one or more pieces of equipment that an intercepted data flow has traversed or originated from. Each device that participates in the chain of custody may insert a network equipment ID into the chain of custody header.

Packet integrity hash value 230 may be the result of a secure hash function, such as a SHA, on the entire packet and a nonce associated with the packet. The law enforcement agency 140 or the data collector, as the only parties who know the nonce, may utilize the nonce and this hash value to verify the packet integrity. The packet integrity hash value 230 may enable a data receiving party, such as the law enforcement agency 140, to verify that a packet has not been modified.

A chain of custody hash value 240 may be a hash value computed using an SHA with a law enforcement agency generated nonce 220, initialization vector 250, network equipment ID 260, and a provider-derived secret. Chain of custody hash value 240 may be utilized to encapsulate a packet at one or more hops of a transmission from the point of intercept until reception of the packet at law enforcement agency 140. Chain of custody hash value 240 may enable law enforcement agency 140 to verify a network equipment ID 260 with a data collector to establish a chain of custody from interception of a packet to reception of a packet at a data receiving party. Each device that participates in the chain of custody may compute and insert a unique chain of custody hash value into the chain of custody header.

Figure 3:
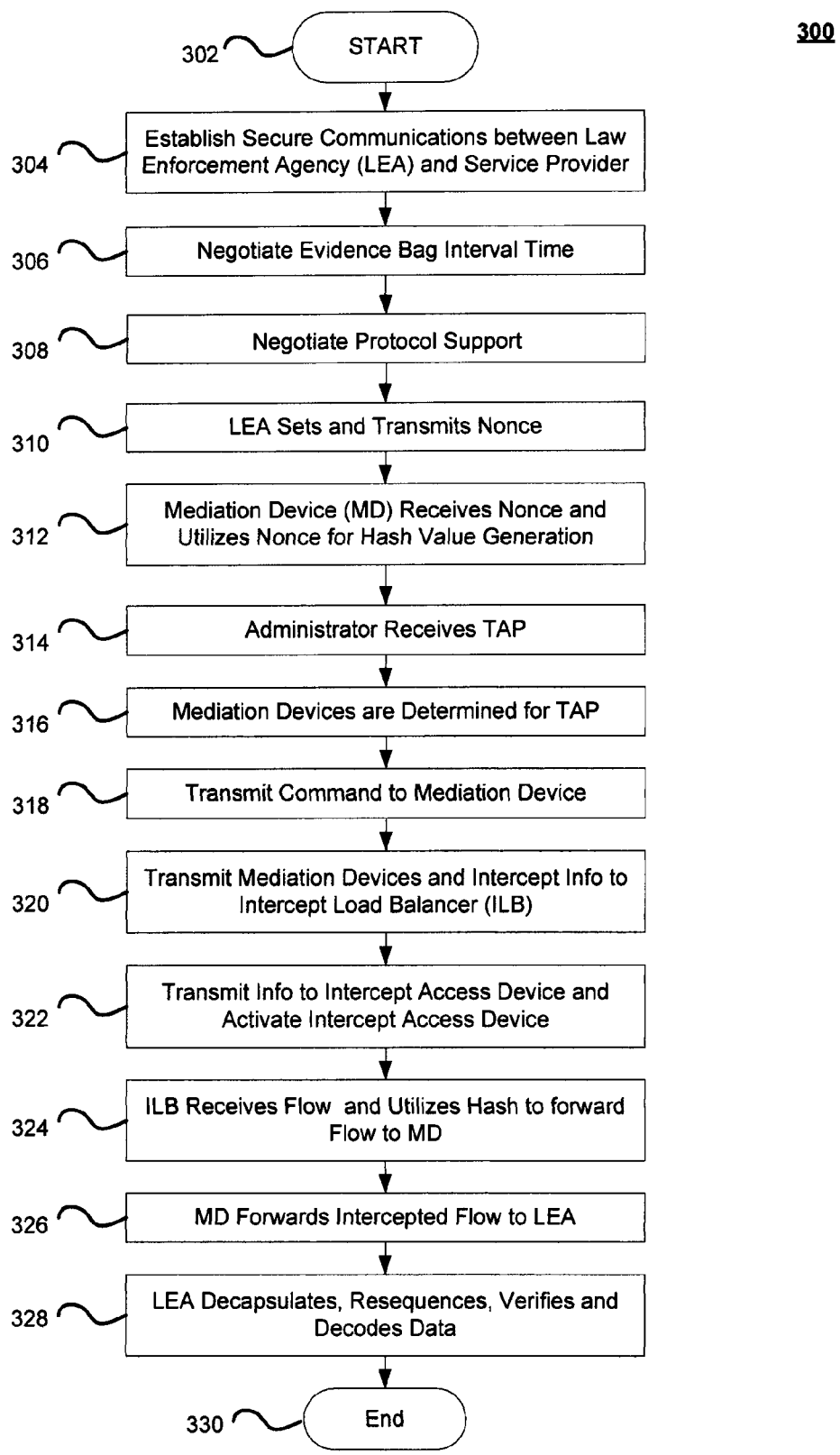
FIG. 3 depicts a method for implementing a system for establishing and maintaining a chain of custody for intercepted information, in accordance with an exemplary embodiment.

FIG. 3 depicts a flowchart of a method 300 a method for implementing a system for establishing and maintaining a chain of custody for intercepted information, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 302.

At block 304, secure communications may be established between a data collecting party and a data receiving party. Communications may be established between data collecting party network equipment and data receiving party network equipment utilizing encryption, authentication and other security mechanisms.

At block 306, the evidence bag interval time may be negotiated. This may correspond to the frequency in which a nonce is generated by a data requesting party and provided to a data collecting party. The evidence bag interval time may correspond to the lifetime of a nonce. The negotiations are discussed in further detail in reference to FIG. 4 below.

At block 308, protocol support may be negotiated between a data receiving party and a data collecting party. For example, a law enforcement agency and a service provider may negotiate and agree upon a particular version of ICCP to utilize.

At block 310, a data receiving party, such as law enforcement agency 140, may set or generate a nonce and may transmit the nonce to the data collecting party. For example, a law enforcement agency 140 may set or generate a nonce and transmit the nonce from network equipment of the law enforcement agency 140 to a mediation device 130 of the data collecting party.

At block 312, a mediation device may receive the nonce and may utilize the nonce for hash value generation. A nonce may be encoded in one or more packets and may be utilized as an input to generate a chain of custody hash value. A hash value may be generated utilizing SHA and other inputs including a network equipment ID and an initialization vector.

At block 314, an administrator, such as administrator 150, may receive a TAP specifying one or more intercepts to be conducted. A TAP may be a set of instructions specifying a target of the intercept. An administrator may set a TAP with one or more mediation devices 130.

At block 316, one or more mediation devices may be determined as intermediate destinations for a particular TAP. The mediation devices may be determined based on a source of intercepted information, a load on a mediation device, a capability or capacity of a mediation device, or other factors. An administrator or an intercept load balancer may determine the one or more mediation devices.

At block 318, one or more commands may be transmitted to one or more mediation devices. Commands may include a command to a mediation device to accept an intercept ID. Commands may specify which data receiving party, such as law enforcement agency 140, to transmit intercepted data to.

At block 320, information specifying one or more mediation devices and an intercept ID may be transmitted to an intercept load balancer.

At block 322, commands and/or information may be transmitted to an intercept access device. The commands may be transmitted utilizing SNMP (Simple Network Management Protocol) or another programmatic method. The information may specify the intercept request, which may enable the intercept access device to determine which data to intercept. For example, an intercept request may specify all HTTP (Hyper Text Transfer Protocol) traffic to and/or from a particular web site. The information may also specify a particular intercept ID and an intercept load balancer to receive the transmitted data. The commands and/or information may activate the intercept access device and start the interception of information. The intercept access device may encode transmission using the chain of custody hash value, the nonce, and a SHA hash value on the entire packet. The transmission may contain the network element ID of the intercept access device. This may enable the verification of this hop of the flow. The intercept access device may transmit the flow to the intercept load balancer.

At block 324, the intercept load balancer may receive a flow from the intercept access device. The intercept load balancer may encapsulate the flow using the chain of custody hash value as above. The intercept load balancer, however, may instead utilize a new chain of custody header using the network equipment ID of the intercept load balancer itself. Thus, this particular hop of the flow may be verifiable. The intercept load balancer may transmit the flow to the mediation device. Transmission of data between and intercept access device and a mediation device may utilize PCLI or some other standardized format for delivery of intercepted data to another destination.

At block 326, the mediation device may receive the flow. The mediation device may encrypt the flow using the chain of custody hash value as above. The mediation device, however, may utilize the network equipment ID of the mediation device itself. This may enable the verification of this hop of the flow. The mediation device may forward the flow to the law enforcement agency or the other data receiving party previously specified pursuant to legal compliance with CALEA. Transmissions of data between the mediation device and the law enforcement agency may utilize T1.IPNA (T1 Internet Protocol Network Access).

At block 328, the law enforcement agency or other data receiving party may receive the flow. The law enforcement agency may decapsulate, resequence, verify, decode, and store the data.

At block 330, the method may end.

Although an intercept load balancer is depicted in FIG. 3, it should be understood as an exemplary piece of equipment in a path of a intercept flow for which a chain of custody is provided. A chain of custody may be provided for one or more pieces of equipment across which a intercept flow is transmitted. The equipment depicted is exemplary and is not required to provide a chain of custody for an intercept flow.

Figure 4:
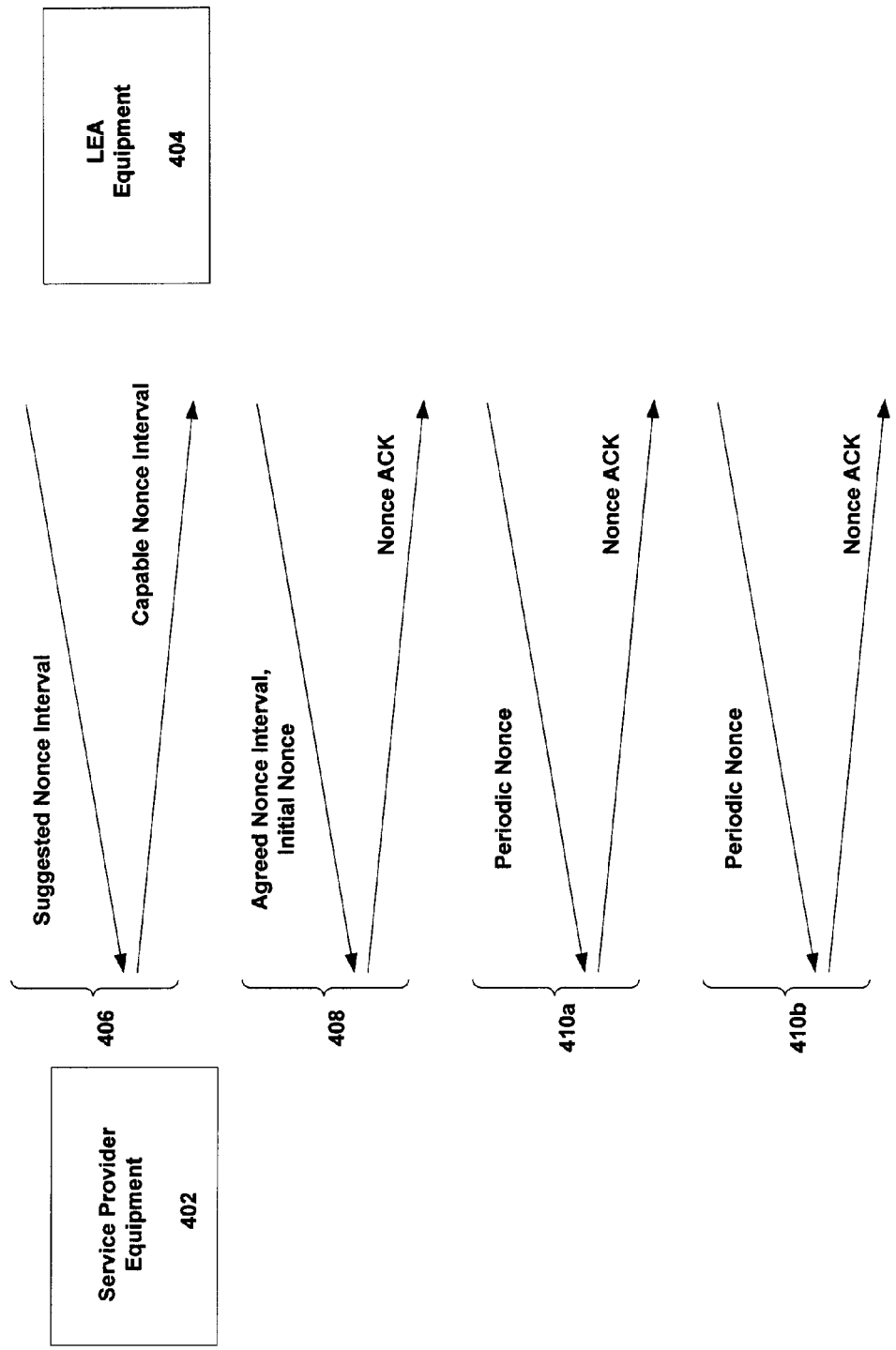
FIG. 4 depicts a sequential communication flow between a system intercepting information and a system receiving intercepted information, in accordance with an exemplary embodiment.

FIG. 4 depicts a sequential communication flow between a system intercepting information and a system receiving intercepted information, in accordance with an exemplary embodiment. Block 402 may be a piece of service provider owned equipment may use a secure form of communication, such as, for example ICCP. Block 404 may be a piece of law enforcement agency or other data receiving party equipment which may use a compatible form of secured communication. Blocks 406, 408 and 410 may represent transmissions and responses between a service provider and a law enforcement agency negotiating protocol and evidence bag interval.

Block 406 may represent an initial communication transmitting a suggested nonce interval from an law enforcement agency as well as an accompanying response supplying the capabilities of a service provider environment. The response may depend upon the capabilities of service provider equipment to support a particular nonce interval. In one or more embodiments, a secured communication protocol, such as an ICCP version, may also be negotiated.

Block 408 may be a confirmation message from a law enforcement agency setting a nonce interval, and providing the initial nonce as well as the corresponding response acknowledgement (ACK) from the service provider.

Blocks 410a and 410b may represent periodic nonces transmitted by an law enforcement agency to a service provider at the agreed upon interval and acknowledged by the service provider.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   negotiating a data collection interval time for electronic data collection between network equipment associated with a data collecting party and network equipment associated with a data receiving party;
   receiving a nonce at a network equipment associated with the data collecting party from network equipment associated with the data receiving party;
   utilizing the nonce to compute, at least in part, a hash value at network equipment associated with the data collecting party;
   collecting electronic data at an intercept access device at network equipment associated with the data collecting party;
   utilizing the nonce and the hash value to transmit the collected electronic data to network equipment associated with the data receiving party; and utilizing the hash value to establish a chain of custody between the data collecting party and the data receiving party.

2. The method of claim 1, wherein the data receiving party is a law enforcement agency.

3. The method of claim 1, wherein the data collecting party is a service provider.

4. The method of claim 1, wherein the hash value is computed utilizing the nonce, a data collecting party secret, an initialization vector and a network element ID.

5. The method of claim 1, wherein the nonce enables the receiving party to verify the validity of the collected data.

6. The method of claim 1, further comprising a second hash value utilized to verify data integrity.

7. The method of claim 6, wherein the second hash value comprises a hash value computed for a packet utilizing the entire packet and the nonce.

8. The method of claim 1, wherein the hash value is computed utilizing a Secure Hash Algorithm (SHA).

9. The method of claim 1, further comprising computing the hash and utilizing the hash to encapsulate a packet for each of one or more hops the packet is transmitted across from network equipment associated with the data collecting party to network equipment associated with the data receiving party.

10. The method of claim 9, wherein encapsulation enables the data receiving party to verify the one or more hops for which the packet is encapsulated.

11. The method of claim 9, wherein the packet contains a network element ID identifying network equipment associated with the one or more hops for which the packet is encapsulated.

12. The method of claim 1, wherein transmitting the collected electronic data utilizes Inter-Control Center Communications Protocol (ICCP).

13. A non-transitory computer readable media comprising code to perform the acts of the method of claim 1.

14. A system, comprising:
   a receiver device configured to receive intercept instructions for intercepting information and a nonce from a data requesting party;
   a computer processor communicatively coupled to the receiver device and configured to:
      negotiate a data collection interval time between the data requesting party and a data collecting party;
      identify and intercept information based on the intercept instructions;
      format the intercepted information utilizing the nonce to compute a hash value;
      utilizing the hash to encapsulate the intercepted information; and
   a transmitter configured to transmit the encapsulated intercept information to the data requesting party.

15. The system of claim 14, wherein nonce enables the data requesting party to verify the validity of the intercepted information.

16. A system, comprising:
   one or more mediation devices configured to receive intercept instructions for intercepting information and a nonce from a data requesting party, wherein the one or more mediation devices utilize the nonce to compute a hash value and the hash value a chain of custody for intercepted information;
   an intercept access device configured to receive the intercept instructions from the one or more mediation devices, wherein the intercept access device identifies and intercepts information based on the intercept instructions; and
   an intercept load balancer configured to receive the intercepted information and transmit the intercepted information to the one or more mediation devices for distribution to the data requesting party.

17. The system of claim 16, wherein the requesting party is a law enforcement agency.

18. The system of claim 16, wherein the mediation device computes the hash value utilizing the nonce, a data collecting party secret, an initialization vector and a network element ID.

19. The system of claim 16, wherein nonce enables the requesting party to verify the validity of the intercepted information.

20. The system of claim 16, further comprising a second hash value utilized by the requesting party to verify data integrity of the intercepted information.

21. The system of claim 16, further comprising computing the hash at least one of: an intercept access device, a mediation device, and an intercept load balancer, wherein the hash is utilized to encapsulate a packet for a hop the packet is transmitted across from the mediation device to the requesting party.

* * * * *